Nov. 15, 1960 W. A. DERINGER 2,959,851
METHOD OF WELDING VESSELS
Filed July 28, 1955
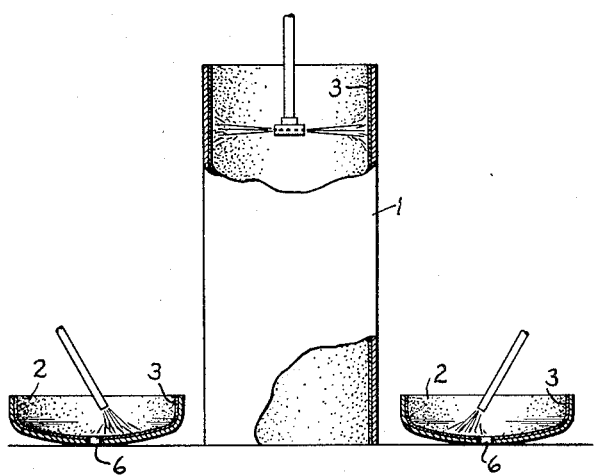
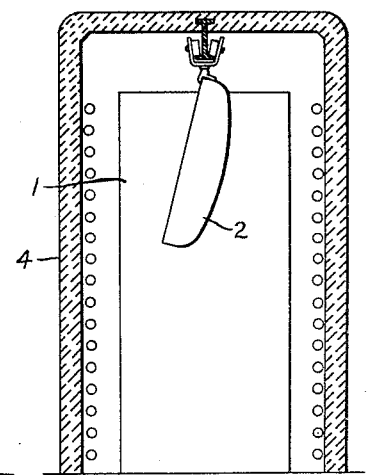
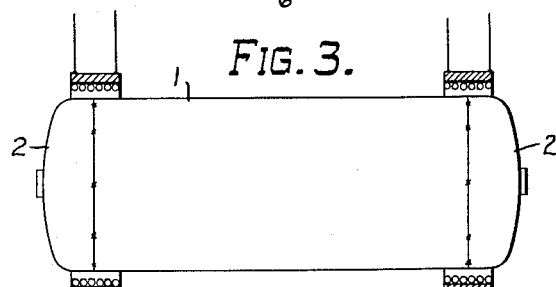
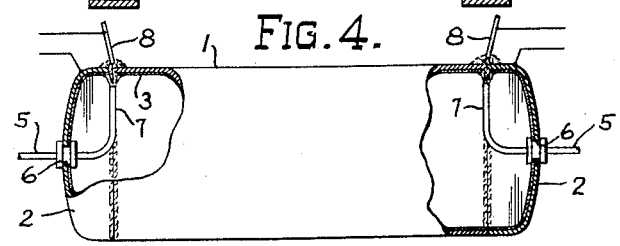
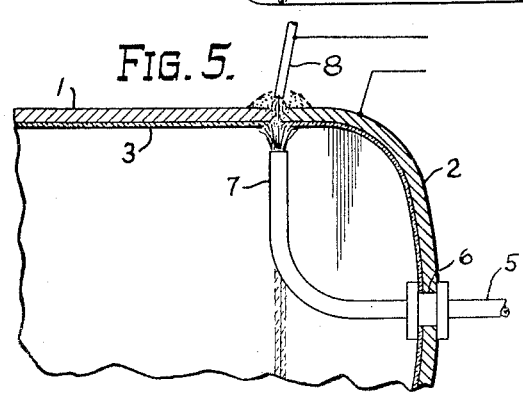
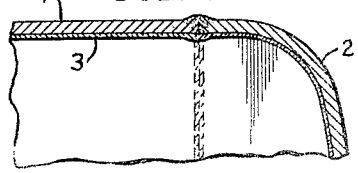
INVENTOR.
Wayne A. Deringer
BY *Andrus & Sceales*
ATTORNEYS

2,959,851
METHOD OF WELDING VESSELS

Wayne A. Deringer, Shorewood, Wis., assignor to A. O. Smith Corporation, Milwaukee, Wis., a corporation of New York Filed July 28, 1955, Ser. No. 524,923

4 Claims. (Cl. 29—458)

This invention relates to a method of welding vessels, and more particularly to a method of welding the top and bottom heads to a cylindrical vessel in the manufacture of glass-lined hot water heater tanks and the like.

In my co-pending application entitled "Method of Welding Glass Lined Vessels," Serial No. 524,922, filed on even date herewith, and assigned to the assignee of the present invention, there is disclosed a method of joining pre-lined vessel components without producing undesirable cracking or crazing of the ceramic enamel or glass in the weld area. This was accomplished by uniformly preheating the area adjacent the abutting edges to be joined prior to welding. For proper results, the heating temperature had to be above the stress point of the glass to prevent cracking thereof during subsequent welding of the heated parts due to stresses, but low enough to prevent the phenomenon of glass from burning away at the edges during said subsequent welding.

At times difficulties have been encountered in the results attained by the above-described method. It has been found that a fine line occasionally occurs along the inside of the welded seam which is not completely covered with glass. This line is undesirable, since the vessel is therefore more subject to corrosion.

Prior to the present invention, it was sometimes necessary to refire the entire vessel in order to eliminate the uncovered portions of the seams. This was costly and time consuming.

The present invention solves the above-described difficulties and produces a glass-lined vessel which is free of all imperfections on the interior of the welded seam. No re-firing is necessary. The method of the invention utilizes the uniform pre-heat step described in my aforementioned co-pending application. In addition, ceramic or glass frit is sprayed on the interior of the seam during the welding operation.

The accompanying drawing illustrates the best mode presently contemplated by the inventor for carrying out the invention.

In the drawing:

Figure 1 is a side elevation of the tank components during the application of the glass lining, and with parts broken away;

Fig. 2 is a transverse section through a furnace showing the firing operation;

Fig. 3 is a side elevation showing the heads tack-welded to the vessel and preheating of the seam prior to final welding;

Fig. 4 is a view similar to Fig. 3 and with parts broken away, showing the welding and spraying step;

Fig. 5 is an enlarged transverse section through a portion of the vessel and showing the welding and spraying step; and Fig. 6 is a view similar to Fig. 5 showing the completed weld.

As shown in the drawing, the invention may be utilized in the manufacture of carbon steel hot water heater tanks which comprise a cylindrical center or tank section 1 closed at the ends by cupped top and bottom head members 2. The interior of the vessel is lined with a ceramic material 3 such as vitreous enamel or the like to aid in the prevention of corrosion.

The method of manufacture of the vessel is as follows:

Tank section 1 and heads 2 are formed from metal stock in any suitable way. These members are then sprayed on their interiors with glass. The glass is bonded or fused to the metal by firing tank section 1 and heads 2 in a furnace 4, and forms a protective lining thereon.

Subsequently, the vessel components are positioned in preparation for the welding step. However, just prior to welding, the areas adjacent the edges to be welded are heated by an induction heater or the like. Once these areas have reached the proper temperature a circumferential weld is made from the outside to join each head 2 to the cylinder 1. It has been found that a submerged arc weld is satisfactory for this purpose.

In order to insure that the ceramic lining 3 will completely cover the inner side of the welded joint, additional glass slip is sprayed onto the inside of the seam at the same place and at the same time the weld is being made from the outside. Any number of means may be used to accomplish the spraying operation. In Figs. 4 and 5 of the drawing there is shown a right angled tube 5 which is supplied at its outer end with glass slip. The inner end passes through a centrally located hole 6 in each head 2. The right angle of tube 5 occurs inwardly of hole 6 so that the inner end 7 of the tube radially faces the seam being welded.

As the weld is being made from the outside, end 7 of tube 5 is moved around the the inside of the vessel so that it coincides with the position of the welding electrode 8 and the ceramic material is sprayed onto the seam. If desired, tube 5 and electrode 8 may be kept stationary and the tank slowly rotated. The heat of welding fuses this additional glass to the joint so that the joint is completely covered. Re-firing of the completed vessel is unnecessary.

In my co-pending application there was given an example of the range of pre-heating temperatures which produce the desired results. The minimum pre-heat temperature given with a glass frit which fires at approximately 1600° F. was 1000° F. The maximum pre-heat temperature was given as 1200° F. If the maximum temperature was exceeded with the method disclosed in that application, the glass would tend to burn away at the edges of the members during welding, leaving an exposed joint.

By spraying glass on the inside of the seam simultaneously and progressively with the welding operation, it has been found that this maximum pre-heating temperature may be substantially increased. Where the maximum previously was 1200° F., it is now possible to use pre-heat temperatures up to 1600° F., which is the firing temperature of the glass. This is highly advantageous, for these higher temperatures completely fuse the newly sprayed-on glass to the welded seam without the need for additional firing of the vessel. In addition, any previously applied glass which might burn away from the edges due to the high pre-heat temperature will be replaced by the sprayed-on glass.

The invention provides a substantial improvement over prior methods of fabricating glass-lined vessels. The finished product is free of flaws in the lining adjacent the welded seams, and therefore much less subject to corrosion. Only a single firing of the vessel components is needed, the high temperature pre-heating serving to properly fuse the sprayed-on enamel to produce a smooth, sealed joint.

Various modes of carrying out the invention are contemplated as being within the scope of the following claims which particularly point out and distinctly claim the subject matter which is regarded as the invention.

I claim:

1. In the method of joining the edge portions of two metal members wherein the members are finally joined by welding, the steps comprising coating a surface of each metal member with glass material, firing said members to fuse the coating to the members uniformly and, preheating said members adjacent the edges to be joined, the heating temperature being higher than the stress point of the glass material to prevent cracking of said material adjacnt the joint during welding but no higher than the firing temperature of the glass, subsequently arc welding the heated edge portions of said metal members together from the side opposite the glass coating to join said edge portions and spraying glass material on the heated joint between the members on the coated side simultaneously with the welding step, said sprayed glass material being fused to said members to completely cover said joint.

2. The method according to claim 1 in which the glass material has a firing temperature of 1600° F., and the stress point temperature above which substantially no cracking occurs is 1000° F.

3. In the method of joining the circumferential edge portions of cylindrical metal tank components wherein the components are finally joined by welding, the steps comprising coating the inner surface of each component with glass material, firing said components to bond the coating to the metal, preheating said components uniformly and to a temperature higher than that which produces cracking of the glass coating during welding but no higher than the firing temperature of the glass, subsequently arc welding said heated components together along their circumferential edges from the unlined side, and spraying glass material on the heated joint between said components on the lined side and simultaneously with the welding step, said sprayed glass material being fused to said members to cover said joint.

4. In the method of arc welding together the abutting circumferential edge portions of cylindrical metal tank members to which a glass interior lining has been bonded, the steps of heating said edge portions uniformly and prior to welding, the heating temperature being higher than the stress point of the glass material to prevent cracking of the material during subsequent welding but no higher than the firing temperature of said material, and progressively spraying additional glass material on the heated joint opposite the welding apparatus and interiorly of the tank and simultaneously with the welding step, the spraying step permitting the said heating temperature to be raised to said firing temperature without damage to the lining covering the joint caused by burning away of the glass adjacent said abutting edges during welding.

References Cited in the file of this patent

UNITED STATES PATENTS

| | | |
|---|---|---|
| 1,673,653 | Wagner | June 12, 1928 |
| 2,166,598 | Kronquest | July 18, 1939 |
| 2,181,319 | Flugge | Nov. 28, 1939 |
| 2,184,534 | Smith et al. | Dec. 26, 1939 |
| 2,263,021 | Uecker | Nov. 18, 1941 |
| 2,302,563 | Masters | Nov. 17, 1942 |
| 2,401,231 | Crawford | May 28, 1946 |
| 2,697,311 | Polan | Dec. 21, 1954 |
| 2,716,690 | Lund | Aug. 30, 1955 |

UNITED STATES PATENT OFFICE
CERTIFICATE OF CORRECTION

Patent No. 2,959,851                       November 15, 1960

Wayne A. Deringer

It is hereby certified that error appears in the above numbered patent requiring correction and that the said Letters Patent should read as corrected below.

Column 3, line 9, strike out "uniformly and", and insert the same after "members" in line 10, same column; same column 3, line 12, for "adjacnt" read -- adjacent --.

Signed and sealed this 10th day of October 1961.

(SEAL)
Attest:

ERNEST W. SWIDER
Attesting Officer

DAVID L. LADD
Commissioner of Patents

USCOMM-DC